H. TAYLOR.
METAL SHEAR.
APPLICATION FILED SEPT. 2, 1909.
959,035.
Patented May 24, 1910.
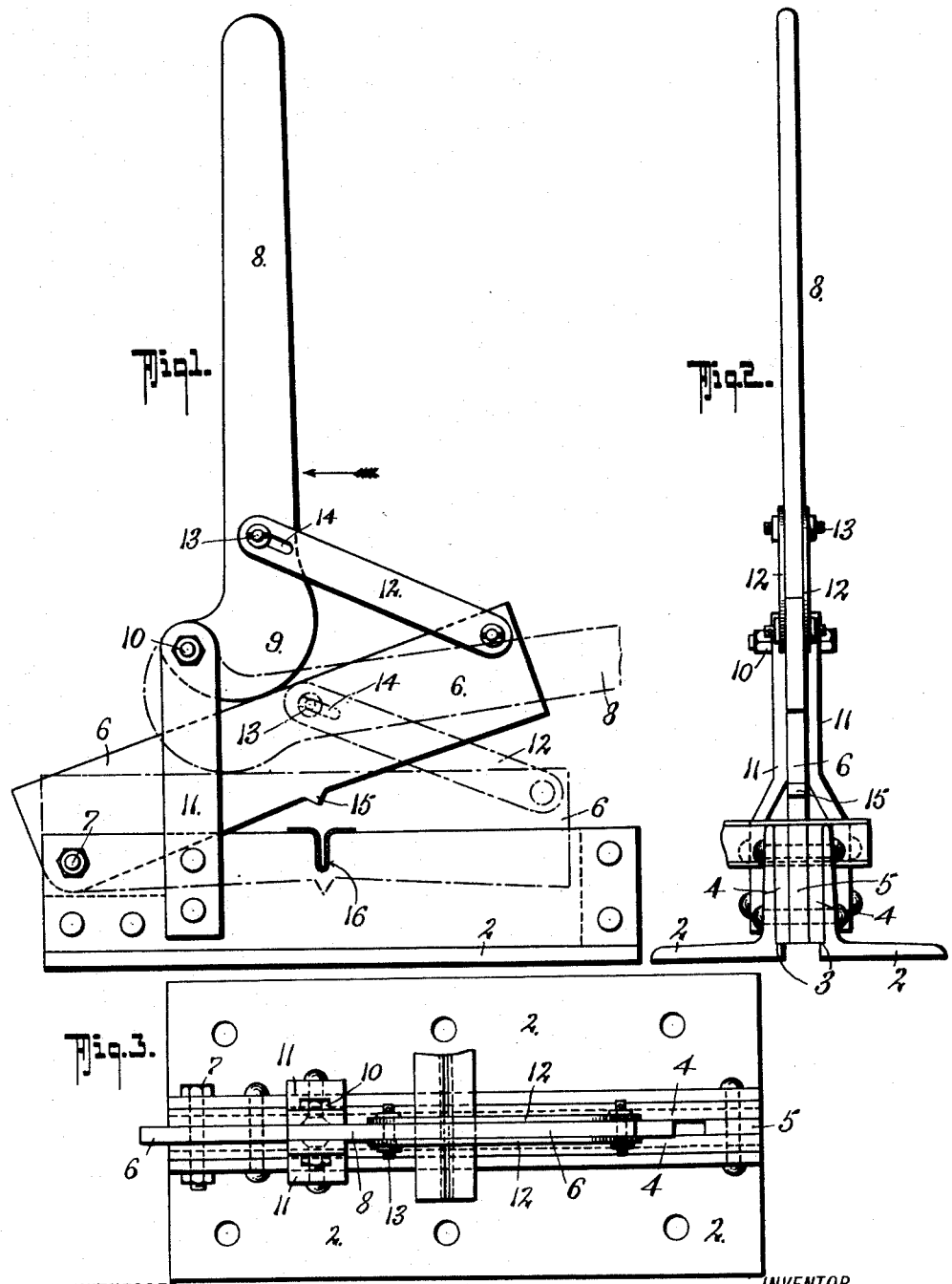
WITNESSES:
Hayward Woodard
Charles H. Wagner
INVENTOR
Harry Taylor
BY
Fred J. Dieterich
ATTORNEY

UNITED STATES PATENT OFFICE.

HARRY TAYLOR, OF VANCOUVER, BRITISH COLUMBIA, CANADA.

METAL-SHEAR.

959,035.  Specification of Letters Patent.  Patented May 24, 1910.

Application filed September 2, 1909. Serial No. 515,797.

*To all whom it may concern:*

Be it known that I, HARRY TAYLOR, citizen of the Dominion of Canada, residing at Vancouver, in the Province of British Columbia, Canada, have invented a new and useful Metal-Shear, of which the following is a specification.

This invention relates to a shear for cross cutting the folded sheet metal tee that is used as studding to receive the lathing in fire proof buildings. This studding on account of the thinness of the metal cannot be satisfactorily sheared by any device at present known, without distortion at the cut of the fold of the tee, and it is to overcome this difficulty that the shearing machine which is the subject of this application has been designed. In it I provide a double bolster, notched to receive the folded web of the tee, between which bolsters the shearing blade is vertically slidable in shearing contact with each, and on the shearing edge of this blade I furnish a V shaped projection the apex of which corresponds with the fold of the tee. By this means a double shear is performed on the tee and the sheared section entirely removed, leaving a clean cut on each adjacent end of the studding which being supported in the notch of the bolsters is not distorted by the shearing pressure.

The invention is particularly described in the following specification, reference being made to the drawings by which it is accompanied, in which:

Figure 1 shows the shearing machine in side elevation, the full lines indicating the shearing blade as raised preparatory to a cut, and the dot and dash lines the position of the blade at the lower limit of its movement. Fig. 2, an end elevation in the direction of the arrow, and Fig. 3, a plan.

In these drawings 2 2 represent angle irons which form the base by which the machine is secured to a bench or stand and which are checked as at 3 to receive the bolster blades 4, the blades being secured apart by distance pieces 5 a sufficient amount to permit the shear blade 6 to move freely between them. The shear blade 6 is pivotally mounted at 7 and is moved downward to effect the shearing by a lever 8 having a cam end 9 and pivotally mounted at 10 to the end of upper members 11 secured to the angle plates 2. The shear blade 6 is lifted by links 12 pin connected to the free end of the shear blade and to a pin 13 on the lever above the cam the connection to 13 having an elongated slot 14 in the links that will freely permit the necessary downward movement of the lever to operate the shear blade 6 by means of the cam 9 on its end. The under side of the shear blade 6 is provided with a V projection 15 corresponding in position to the fold of the tee iron resting in the notch 16 of the bolster plates 4.

In operation the folded web of the tee iron is placed in the notch 16 of the bolster plates and the lever 8 is moved down to the position indicated by dot and dash lines in Fig. 1 when the eccentricity of the cam 9 will force down the shear blade 6 and it will cut a narrow section from the studding corresponding with the width of the shear blade and as the ends adjacent to the sheared portion are both supported by the notch 16 of the bolster plates they are not distorted by the shearing pressure. The V projection 15 assists the shearing action by cutting laterally outward instead of merely crushing down as it would do were the cutting edges of the shear blade straight.

If considered desirable instead of carrying the bolster plate the entire length of the base angle irons they may be short plates embracing the area adjacent to the notch and removably attached that they may be readily renewed when required.

A shearing means is thus provided that fully answers the purpose for which it is designed and is simple both in construction and in operation.

I am aware that prior to my invention cam operated shearing blades have been used, but I do not know of any in which the shearing blade is operative between two shearing bolster plates so that the blade shears simultaneously through two sections of the material to be cut nor am I aware of a shear having a notched bolster plate and a corresponding downward projection from the cutting edge of the shearing blade.

Having now particularly described my invention and the manner of its operation, I hereby declare that what I claim as new and desire to be protected in by Letters Patent, is:

1. In a shear of the class described, the combination with two bolster plates secured the required distance apart the upper edges of which plates are notched to receive the material to be cut, a shear blade pivotally mounted so as to be slidable between the bolster plates the under side of which blade is provided with a downward V projection the apex of which corresponds with the center of the notches in the bolster plates, a lever having a cam end pivotally mounted so that the edge of the cam bears upon the upper edge of the shear plate, and links pin-connected to the free end of the shear blade and to the lever above the fulcrum said links having elongated slots at their connection with the lever.

2. In a shear of the character stated, the combination with a pair of bolster plates secured together and spaced apart, said bolster plates having an upper surface and a notched portion merging with said upper surface intermediate its ends to receive a flanged channel strip to rest with its channel portion in said notch and its flanges on said upper surface, a shearing blade hinged at one end to said bolster plates to be movable between the same, said shearing blade having a downwardly projecting V intermediate its ends to correspond with the mid-width of said notches in said bolster plates, and means for forcibly pressing down the shearing blade to first shearingly cut one of said flanges and to force said V to cut the channel portion of said flanged channel strip, and then shear the other flange of said strip, substantially as shown and described.

In testimony whereof I have signed my name to this specification in the presence of two subscribing witnesses.

HARRY TAYLOR.

Witnesses:
ROWLAND BRITTAIN,
JOSEPH POWE.